3,282,949
SUBSTITUTED LOWER FATTY ACID AMIDES AND PROCESSES

Leo Berger, Montclair, Alfred John Corraz, Packanack Lake, and John Lee, Montclair, N.J., assignors to Hoffmann-La Roche Inc., Nutley, N.J., a corporation of New Jersey
No Drawing. Filed July 3, 1963, Ser. No. 292,768
10 Claims. (Cl. 260—295)

The present invention relates to substituted lower fatty acid amides. More particularly, the present invention relates to substituted phenyl-N-(1,2,5,6-tetrahydro-1,3-di-lower alkyl-4-pyridyl)-lower fatty acid amides and to processes for their preparation.

The novel substituted lower fatty acid amides of the invention have the formula

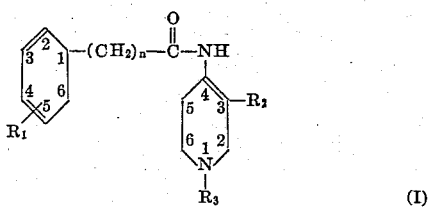

(I)

wherein $R_1$ is hydrogen; halogen, e.g., fluorine, chlorine, or bromine, preferably chlorine; nitro; amino; lower alkylamino; phenyl lower alkylamino; halo-substituted phenyl lower alkylamino; lower alkoxy-substituted phenyl lower alkylamino; and di-lower alkylamino; and $R_2$ and $R_3$ are lower alkyl groups, preferably methyl; and $n$ is the whole number 1, 2 or 3.

Preferred compounds of Formula I are those wherein $R_1$ is in the para-position of the $-(CH_2)_n-$ group. The invention also relates to acid addition salts of the compounds of Formula I with pharmaceutically acceptable acids.

The compounds of Formula I and their acid addition salts exhibit blood pressure-lowering activity and analgesic activity and are useful as hypotensive agents and as analgesics.

The compounds of Formula I wherein $R_1$ is hydrogen, halogen, or nitro are prepared by reacting a substituted phenyl lower fatty acid amide of the formula

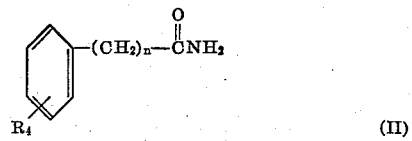

(II)

with a substituted 4-piperidone of the formula

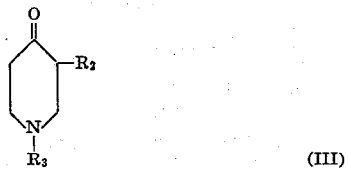

(III)

in the presence of either sulfuric acid or a mixture of phosphorus pentoxide and ortho-phosphoric acid, to form a compound of the formula

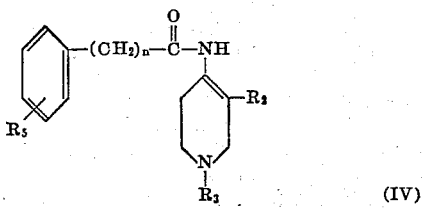

(IV)

In the above reaction scheme $R_4$ is hydrogen, halogen, e.g., F, Cl, Br, preferably chlorine, or nitro, and $R_2$, $R_3$, and $n$ have the meanings given above.

The above reaction can also be carried out using a nitrile in place of the acid amide of Formula II, i.e., a compound of the formula

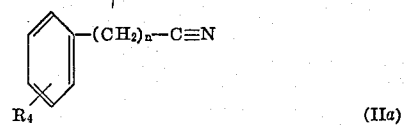

(IIa)

wherein $R_4$ and $n$ have the same meanings as in Formula II.

In the above process, a mixture of phosphorus pentoxide and ortho-phosphoric acid is preferred. In general, from about 2.5 to about 10.0, preferably from about 5 to about 6 parts by weight of phosphorus pentoxide, and from about 2.5 to about 10.0, preferably from about 5 to about 6 parts by weight of ortho-phosphoric acid is employed, based on the weight of substituted amide or nitrile used. The phosphoric acid can be anhydrous, but preferably a small quantity of water is present, i.e., up to about 15 percent water, e.g., 85 percent phosphoric acid. The reaction is carried out at a temperature in the range of from about 50° to about 160°, preferably from about 80° to about 110° C. When sulfuric acid is employed, the sulfuric acid is preferably anhydrous but can contain up to about 2 percent water. From about 0.85 to about 1.2 parts by weight of sulfuric acid, based on the weight of substituted amide or nitrile is usually employed. When sulfuric acid is used an organic solvent, e.g., chloroform, is preferably employed for carrying out the reaction. Other solvents that can be employed include carbon tetrachloride, methylene chloride, benzene, heptane, etc.

The compound of Formula IV is isolated from the above reaction mixture by neutralizing the reaction mixture with alkali, preferably in aqueous solution, which precipitates the product, and then removing the product from the neutralized aqueous solution, e.g., by filtration.

Compounds of Formula I wherein $R_1$ is amino are prepared from a compound of Formula IV wherein $R_4$ is nitro according to the following reaction scheme:

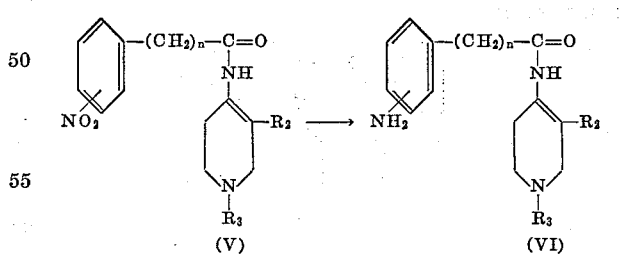

(V)    (VI)

wherein $R_2$, $R_3$, and $n$ have the meanings given above. The reduction of Compound V is carried out by treatment of Compound V with hydrogen in the presence of a hydrogenation catalyst, e.g., $PtO_2$, palladium-on-charcoal, Raney nickel, rhodium-on-carbon (or alumina), etc., preferably in the presence of a solvent, e.g., a lower alkanol.

Compounds of Formula IV wherein $R_4$ is a substituted-amino group are prepared by reacting a compound of Formula IV and an aldehyde to give a Schiff's base which is then reduced, for example, with hydrogen in the presence of a hydrogenation catalyst such as the above, or a group I-group III mixed metal hydride, sodium borohydride, lithium aluminum hydride, etc., i.e., according to the following reaction scheme:

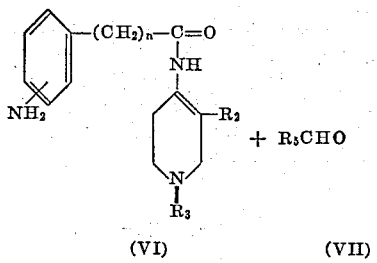

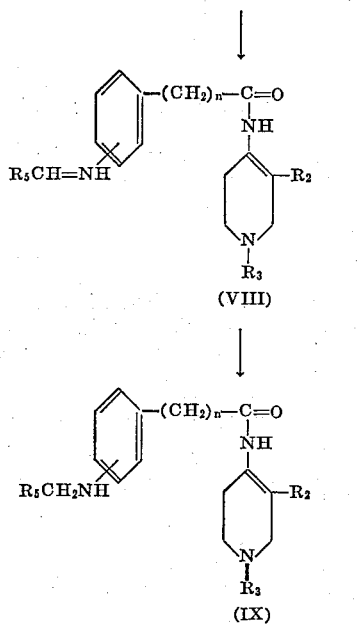

In the above reaction scheme $R_5$ is hydrogen, an alkyl group having from 1 to 6 carbon atoms, a phenyl group, or a halo- or lower alkoxy-substituted phenyl group; and $R_2$ and $R_3$ have the meanings given above. Examples of aldehydes of Formula VII that can be employed include formaldehyde, benzaldehyde, anisaldehyde, 3,4-dimethoxybenzaldehyde, parachlorobenzaldehyde, etc.

When a tertiary amino group having a lower alkyl group is desired, the above reaction scheme is carried out a second time, using the compound of the Formula IX as the starting material, i.e., according to the following reaction scheme:

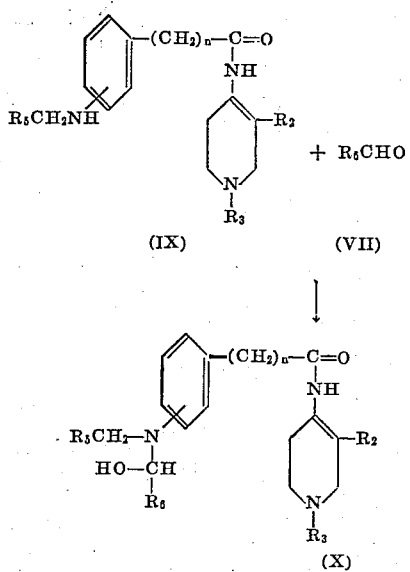

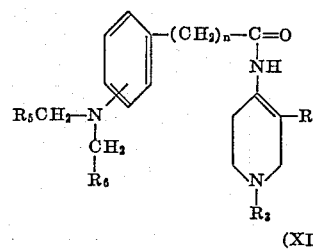

to give a compound of Formula XI wherein $R_6$ is hydrogen or alkyl having from 1 to 6 carbon atoms, depending on the aldehyde of Formula VII chosen for the reaction.

The invention will be better understood by reference to the following examples which are given for illustration purposes only and are not meant to limit the invention.

*Example 1.—Preparation of 2-phenyl-N-(1,2,5,6-tetrahydro-1,3-dimethyl-4-pyridyl)acetamide*

A solution of 70 g. of phosphorus pentoxide in 70 g. of 85 percent phosphoric acid is prepared by placing the phosphorus pentoxide in a flask equipped with a stirrer, and adding the phosphoric acid thereto with caution. When the initial exothermic reaction subsides (the mixture heats up to a temperature of 200–250° C.) the mixture is heated externally (200–250°) with constant stirring until a clear viscous solution is obtained. The solution is then cooled to room temperature with constant stirring. To the thick solution with constant stirring at room temperature are added 6.0 g. of phenylacetamide and 10.0 g. of 1,3-dimethylpiperidone-4 in that order. The mixture is then heated to 100° with constant stirring and kept at 100° for 10 hours.

Water is added to the reaction mixture and the insolubles filtered off. The acidic solution is made basic with sodium hydroxide flakes (cooling) and the base that is obtained is crystallized with Skellysolve "B" and ethyl acetate to yield the product, 2-phenyl-N-(1,2,5,6-tetrahydro-1,3-dimethyl-4-pyridyl)acetamide, M.P. 140–142°.

*Example 2.—Preparation of 2-(4-nitrophenyl)-N-(1,2,5,6-tetrahydro-1,3-dimethyl-4-pyridyl)acetamide*

To a solution of 75 g. of phosphorus pentoxide in 75 g. of 85 percent phosphoric acid are added 20 g. of p-nitrophenylacetamide and 20 g. of 1,3-dimethylpiperidone-4. The mixture is heated to 100° for 10 hours, and then diluted with water. The insoluble material is filtered off and the acidic solution made basic with strong alkali. A solid base, 2-(4-nitrophenyl)-N-(1,2,5,6-tetrahydro-1,3-dimethyl-4-pyridyl)acetamide, is obtained that melts at 162–164° when recrystallized from ethyl acetate.

*Example 3.—Preparation of 2-(4-aminophenyl)-N-(1,2,5,6-tetrahydro-1,3-dimethyl-4-pyridyl)acetamide*

5.0 g. of 2-(4-nitrophenyl)-N-(1,2,5,6-tetrahydro-1,3-dimethyl-4-pyridyl)acetamide dissolved in 180 ml. of ethanol (containing a slight excess of hydrogen chloride) and 0.3 g. of platinum oxide are shaken in a "Parr bomb" under 3.5 atm. of hydrogen for 3 hours. There is no external heating during the reduction; however, the internal temperature reaches a maximum of 36°. After the reaction has taken up slightly more than the theoretical amount of hydrogen, the reduction is stopped and the catalyst filtered off through Hyflo. The filtrate is concentrated to dryness. The residue is dissolved in 50 ml. of water, excess potassium carbonate added, and the base extracted with chloroform. The chloroform solution is dried over potassium carbonate, the desiccant filtered off, and the chloroform removed on a water bath. The residue is crystallized from a mixture of acetone and Skellysolve "B," to give the product, 2-(4-aminophenyl)-N-(1,2,5,6-tetrahydro-1,3-dimethyl-4-pyridyl)acetamide, M.P. 153–154° (uncorr.).

*Example 4.—Preparation of 2-(4-dimethylaminophenyl)-N-(1,2,5,6-tetrahydro - 1,3 - dimethyl-4-pyridyl)-acetamide*

A mixture of 2-(4-nitrophenyl)-N-(1,2,5,6-tetrahydro-1,3-dimethyl-4-pyridyl)acetamide, 4 g. of 37 percent formaldehyde, 1 teaspoon of Raney nickel and enough methanol to bring the volume to 180 ml. is shaken in a "Parr bomb" under 3.7 atm. of hydrogen at 68°. After 3½ hours, slightly more than the theoretical amount of hydrogen is taken up. The reaction is stopped. When the reaction mixture cools to room temperature, the catalyst is filtered off through Hyflo, and the filtrate concentrated to dryness under reduced pressure on a water bath. The residue is crystallized from Skellysolve "B" to give the product 2-(4-dimethylaminophenyl) - N - (1,2,5,6-tetrahydro-1,3-dimethyl-4-pyridyl)acetamide, M.P. 124–125° (uncorr.).

*Example 5.—Preparation of 2-(4-benzylaminophenyl)-N-(1,2,5,6-tetrahydro-1,3-dimethyl-4-pyridyl)acetamide*

A mixture of 2 g. of 2-(4-aminophenyl)-N-(1,2,5,6-tetrahydro-1,3-dimethyl-4-pyridyl)acetamide and 0.8 g. of benzaldehyde is heated 1 hour on a steam bath. After the mixture cools to room temperature, 100 mg. of platinum oxide and 180 ml. of glacial acetic acid are added. The mixture is shaken in a "Parr bomb" under 3.6 atm. of hydrogen at room temperature. Within 2 hours, the theoretical amount of hydrogen is taken up and the reaction is stopped. The catalyst is filtered off through Hyflo and the filtrate concentrated to dryness under reduced pressure on a water bath. The residue is dissolved in 100 ml. of water. Excess potassium carbonate is added and the mixture extracted with chloroform. After the chloroform solution is dried over potassium carbonate, the desiccant is filtered off and the solvent removed on a water bath. The residue is crystallized from Skellysolve "B" to give the product, 2-(4-benzylaminophenyl) - N - (1,2,5,6-tetrahydro-1,3-dimethyl-4-pyridyl)acetamide, M.P. 101–105° (uncorr.).

*Example 6.—Preparation of 2-(4-chlorophenyl)-N-(1,2,5,6-tetrahydro-1,3-dimethyl-4-pyridyl)acetamide*

A solution of 75 g. of phosphorus pentoxide in 75 g. of 85 percent phosphoric acid is prepared according to the process of Example 1. With constant stirring of the thick solution, 20 g. of p-chlorophenylacetamide and 20 g. of 1,3-dimethylpiperidone-4 are added and the mixture heated at 100° for 10 hours. Water is then added and the insoluble material filtered off and the acidic solution made basic with strong alkali.

The solid base that separates is filtered and air dried, M.P. 152–154°. The base, 2-(4-chlorophenyl)-N-(1,2,5,6-tetrahydro-1,3-dimethyl-4-pyridyl)acetamide, is recrystallized from acetone and melts at 156–157°.

The base is converted to the hydrobromide with alcoholic HBr, M.P. 165–172° (solvated) after recrystallization from acetone, and 184–186° when dry.

*Example 7.—Preparation of 2-[4-(4-chlorobenzylamino)phenyl]-N-(1,2,5,6-tetrahydro - 1,3 - dimethyl-4-pyridyl)acetamide*

A mixture of 7 g. of 2-(4-aminophenyl)-N-(1,2,5,6-tetrahydro-1,3-dimethyl-4-pyridyl)acetamide, 200 ml. of benzene and 4 g. of p-chlorobenzaldehyde is refluxed and stirred for 6 hours. During the reaction, 0.5 ml. of water is removed by means of a Dean-Stark receiving tap. The mixture is cooled to +3°, filtered and air dried, M.P. M.P. 170–183°. Following recrystallization from ethyl acetate, the M.P. is 192–193°. The Schiff's base is dissolved in 180 ml. of glacial acetic acid and 0.2 g. of platinum oxide is added. The mixture is shaken in a "Parr bomb" under 3.7 atm. of hydrogen at room temperature. After 30 minutes, slightly more than the theoretical amount of hydrogen is taken up. The reaction is stopped. Following the removal of the catalyst by filtration, the acetic acid is removed under reduced pressure on a water bath. The residue is dissolved in 200 ml. of water. Excess potassium carbonate is added and the mixture extracted with chloroform. After the chloroform solution is dried over sodium sulfate, the desiccant is filtered off and the solvent removed on a water bath. Following crystallization of the residue with ethyl acetate, the product, 2-[4-(4-chlorobenzylamino)phenyl]-N-(1,2,5,6-tetrahydro - 1,3 - dimethyl-4-pyridyl)acetamide is obtained, M.P. 129.5–131°. The small portion is again recrystallized from ethyl acetate and the melting point becomes 130–131.5°.

*Example 8.—Preparation of 2-[4-(3,4-dimethoxybenzylamino)phenyl]-N-(1,2,5,6-tetrahydro - 1,3 - dimethyl-4-pyridyl)acetamide*

A mixture of 9 g. of 2-(4-aminophenyl)-N-(1,2,5,6-tetrahydro-1,3-dimethyl-4-pyridyl)acetamide, 200 ml. of benzene and 6 g. of 3,4-dimethoxybenzaldehyde is refluxed and stirred for 5 hours. During the reaction, 1 mole of water is removed by means of a Dean-Stark receiving tap. The volatile components are removed under reduced pressure and a small portion of the residue recrystallized from acetone, M.P. 156–157°. The residue is dissolved in 150 ml. of methanol and heated to reflux with stirring. 4 g. of sodium borohydride dissolved in 50 ml. of cold methanol is added as rapidly as the evolution of hydrogen from the reaction mixture permits. When the addition is over, the reaction mixture is refluxe and stirred for an additional hour, cooled to room temperature and decomposed with 20 ml. of water. Excess sodium chloride is added and the mixture extracted with chloroform. After the chloroform solution is dried over sodium sulfate, the desiccant is filtered off and the chloroform removed on a water bath. The residue is recrystallized from acetone to give the product, 2-[4-(3,4-dimethoxybenzylamino)phenyl] - N - (1,2,5,6-tetrahydro-1,3-dimethyl-4-pyridyl)acetamide, M.P. 138–142°.

*Example 9.—Preparation of 2-(4-methylaminophenyl)-N-(1,2,5,6-tetrahydro-1,3-dimethyl-4-pyridyl)acetamide*

A mixture of 5 g. of 2-(4-nitrophenyl)-N-(1,2,5,6-tetrahydro-1,3-dimethyl-4-pyridyl)acetamide, 1.5 g. of 37 percent aqueous formaldehyde, ½ teaspoon of Raney nickel and enough methanol to bring the volume to 180 ml. are shaken in a "Parr bomb" under 3.5 atm. of hydrogen. The temperature is maintained near 76° during the reaction. After 7 hours, slightly less than the theoretical amount (4 moles) of hydrogen is taken up. The reaction is stopped. When the reaction mixture cools to room temperature, the catalyst is filtered off through Hyflo and the filtrate concentrated to dryness under reduced pressure on a water bath. The residue is crystallized from Skellysolve "B" to give the product, 2-(4-methylaminophenyl)-N-(1,2,5,6-tetrahydro - 1,3 - dimethyl-4-pyridyl)-acetamide, M.P. 94–96° (uncorr.).

*Example 10.—Preparation of 3-phenyl-N-(1,2,5,6-tetrahydro-1,3-dimethyl-4-pyridyl)propionamide*

To a solution of 75 g. of phosphorus pentoxide in 75 g. of 85 percent phosphoric acid are added 20 g. of hydrocinnamonitrile and 20 g. of 1,3-dimethylpiperidone-4 and the mixture heated with stirring for 10 hours at 100°. The cooled reaction mixture is poured onto ice water and the insolubles filtered off. The acidic solution is made basic with strong alkali and the base that separates is dissolved in chloroform. The chloroform solution is dried, filtered from a drying agent, and concentrated to dryness. The residual base is crystallized from ethyl acetate to give the product, 3-phenyl-N-(1,2,5,6-tetrahydro-1,3-dimethyl-4-pyridyl)propionamide, melting at 115–117°.

An additional quantity of product is recovered from the ethyl acetate mother liquors via concentration. Further recrystallization from ethyl acetate does not alter the melting point.

*Example 11.—Preparation of 4-phenyl-N-(1,2,5,6-tetrahydro-1,3-dimethyl-4-pyridyl)butyramide*

To a solution of 50 g. of phosphorus pentoxide in 50 g. of 85 percent phosphoric acid are added 10.0 g. of γ-phenylbutyronitrile and 10.0 g. of 1,3-dimethylpiperidone-4. The reaction mixture is heated with stirring at 100° for 10 hours and worked up according to the process of Example 1. There is obtained 10.3 g. of crude crystalline base, 4-phenyl-N-(1,2,5,6-tetrahydro-1,3-dimethyl-4-pyridyl)butyramide, melting at 118–120°. One recrystallization from ethyl acetate gave the pure base, melting at 118–120°.

We claim:

1. A compound of the formula

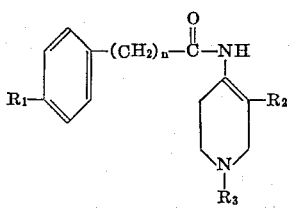

wherein $R_1$ is selected from the group consisting of hydrogen, halogen, nitro, amino, lower alkylamino, phenyl-lower alkylamino, halo-substituted-phenyl-lower alkylamino, lower alkoxy-substituted-phenyl-lower alkylamino, and di-lower alkylamino; $R_2$ and $R_3$ are lower alkyl groups; and $n$ is a whole number selected from the group consisting of 1, 2, and 3.

2. A compound according to claim 1 wherein $R_2$ and $R_3$ are methyl groups.

3. A compound of the formula

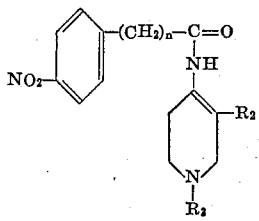

wherein $R_2$ and $R_3$ are lower alkyl groups and $n$ is a whole number selected from the group consisting of 1, 2, and 3.

4. A compound of the formula

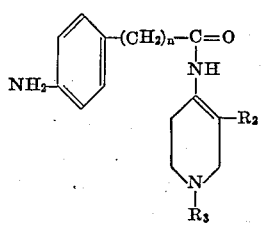

wherein $R_2$ and $R_3$ are lower alkyl groups and $n$ is a whole number selected from the group consisting of 1, 2, and 3.

5. A compound of the formula

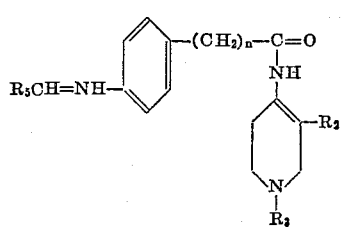

wherein $R_2$ and $R_3$ are lower alkyl groups; $R_5$ is selected from the group consisting of hydrogen, an alkyl group having from 1 to 6 carbon atoms, phenyl, halo-substituted-phenyl, and lower alkoxy-substituted-phenyl; and $n$ is a whole number selected from the group consisting of 1, 2 and 3.

6. A compound of the formula

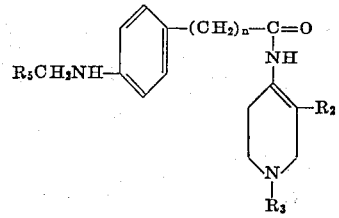

wherein $R_5$ is selected from the group consisting of hydrogen, an alkyl group having from 1 to 6 carbon atoms, a phenyl group, or a halo- or lower alkoxy-substituted-phenyl group; and $n$ is a whole number selected from the group consisting of 1, 2, and 3.

7. 2 - (4 - dimethylaminophenyl) - N - (1,2,5,6 - tetrahydro-1,3-dimethyl-4-pyridyl)acetamide.

8. 2 - (4 - benzylaminophenyl) - N - (1,2,5,6 - tetrahydro-1,3-dimethyl-4-pyridyl)acetamide.

9. 2 - (4 - chlorophenyl) - N - (1,2,5,6 - tetrahydro-1,3-dimethyl-4-pyridyl)acetamide.

10. A process for preparing a compound of the formula

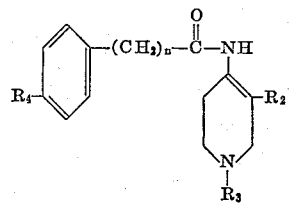

wherein $R_2$ and $R_3$ are lower alkyl groups; $R_4$ is selected from the group consisting of hydrogen, halogen, and nitro; and $n$ is a whole number selected from the group consisting of 1, 2, and 3, comprising the steps of reacting a compound selected from the group consisting of (a) a compound of the formula

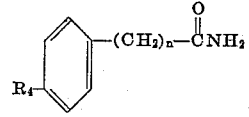

and (b) a compound of the formula

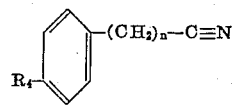

with a compound of the formula

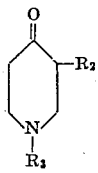

in the presence of a substance selected from the group consisting of
(a) a mixture of phosphorus pentoxide and phosphoric acid and
(b) sulfuric acid,
and isolating a compound of Formula I from the reaction mixture; wherein $R_2$, $R_3$, $R_4$, and $n$ in Formulas II, IIa, III have the same meanings as in Formula IV.

(References on following page)

References Cited by the Examiner

UNITED STATES PATENTS 2,219,879  10/1940  Vanderbilt _____ 260—566 XR
3,019,262  1/1962  Ambelang _____ 260—570.9

OTHER REFERENCES

Fieser and Fieser, "Organic Chemistry," 3rd ed., pp. 211, 600 Heath, 1958.

Noller, "Chemistry of Organic Compounds," 2nd ed., pp. 456, 457, 535, Saunders (1957).

Royals, "Advanced Organic Chemistry," 1st ed., p. 653, Prentice-Hall, 1954.

WALTER A. MODANCE, *Primary Examiner*.

JOHN D. RANDOLPH, *Examiner*.

A. L. ROTMAN, *Assistant Examiner*.